(No Model.)
R. GREGG.
HAY DRAG.
No. 466,522.   Patented Jan. 5, 1892.
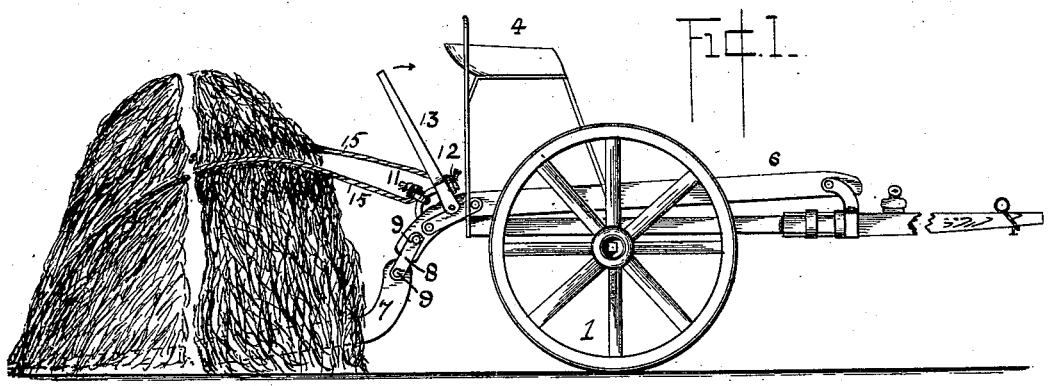
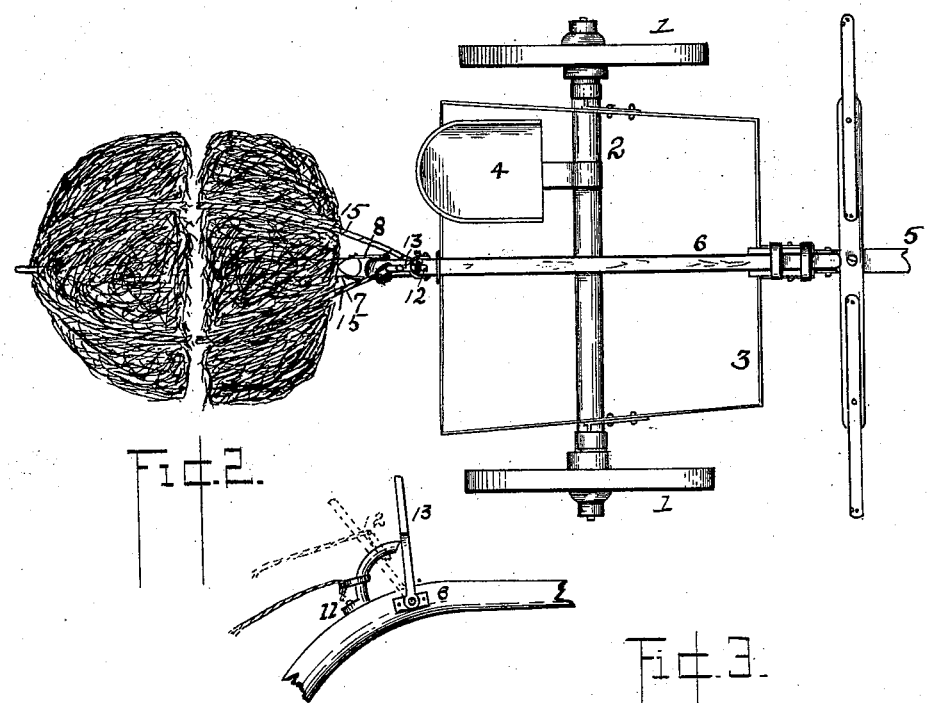
Witnesses.
Inventor.
R. Gregg
By W. H. Bartlett
Atty.

UNITED STATES PATENT OFFICE.

RICHARD GREGG, OF RANDOLPH, INDIANA.

HAY-DRAG.

SPECIFICATION forming part of Letters Patent No. 466,522, dated January 5, 1892.

Application filed June 17, 1891. Serial No. 396,656. (No model.)

*To all whom it may concern:*

Be it known that I, RICHARD GREGG, of Randolph, Ohio county, with post-office at Aurora, in the county of Dearborn and State of Indiana, have invented certain new and useful Improvements in Hay-Drags, of which the following is a specification, reference being had therein to the accompanying drawings.

This invention relates to wheel-drags or pronged sulkies used for transporting hay in the field.

The object of the invention is to produce a light vehicle to which a hay-cock or small stack may be quickly attached, and by which the hay-cock may be transported in the field; also, to provide means for the attachment of the hay-cock and the speedy release of the same.

Figure 1 is a side elevation of the sulky-drag. Fig. 2 is a plan of same. Fig. 3 is a broken detail elevation showing hook, lever, and connections.

The numeral 1 indicates the wheel and 2 the axle of a sulky, which is provided with an open frame or brace 3 and a seat 4. The sulky may have thills or a pole 5, as indicated. A reach 6 extends back from the shaft or pole to a position preferably a little in rear of the driver's seat, and is preferably bent downward in rear of the axle. A drag-bar 7 is connected by a loose hinge or pivot to the rear end of the reach. This drag-bar may be held by links 8, one at each side of the bar and reach, and connected by bolts 9 9 to the two parts; or a simple hinge or other construction may be used. The drag-bar will extend, say, twelve to sixteen feet to the rear of the wheels, and its rear end rides on the ground, the body of the bar being nearly parallel with the surface of the ground, the front end bending upward near the loose hinge or pivot connection. The rear end of the drag-bar is rounded, so that it will not run into the ground when backed, but will all the time lie very close to the ground. A bracket 11 is attached to the rear end of the reach. The front end 12 of this bracket extends upward and forward as a hook. A lever 13 is hinged to the reach and its body is preferably slotted to straddle the hook or lies close to the hook. A cord or chain 15 is attached to the bracket or in other convenient position near the rear end of the reach. This cord should have a number of rings or grommets near its free end.

For loading, the vehicle is backed up to a hay cock or stack and the drag-bar forced back under the cock until it projects from the opposite side thereof. The cord 15 is then carried to the rear, extending across the hay-cock about half-way up, and thence obliquely to the rear and under the projecting end of bar 7, and thence forward at the opposite side of the bar and hay-cock, and a suitable ring in the cord is hooked onto the hook 12, thus binding the hay-cock tightly to the drag-bar. When the team is started, the hay-cock will ride on the drag-bar, the rope holding it tightly thereto. When it is desired to detach the load, the driver swings lever 13, detaching the ring from the end of the hook 12 and permitting the rope to loosen and the drag-bar to draw out from under the hay-cock. The load will thus be left wherever loosened. With this drag a man or boy and a team can move hay-cocks or small stacks from place to place in a hay-field, the cock sliding easily over the stubble when bound by the cord and partly supported by the drag-bar. No time is lost in pitching and the drag can be backed under a hay-cock and the cord applied in a very few seconds.

While I regard my form of wheeled sulky the best body-support yet devised, it is quite apparent that the drag-bar may be attached to other vehicles, as a cart or sled, and the principles of the invention will not be altered. It will also be understood that the hay-cock may be tied to the drag-bar in other manner than that herein described. I have shown this form as the best with which I am at present acquainted.

What I claim is—

1. The sulky-body, the bar projecting rearwardly therefrom, a binding-cord attached near the front of the bar, and a hook and detaching-lever, to which hook the free end of the cord may be temporarily connected.

2. The sulky-body, the drag-bar pivotally connected to the body, the binding-cord connected to the body at one end and provided with means for attaching to a hook near the other end, and means for releasing the cord from the hook, in combination, substantially as described.

3. A hay-drag consisting, essentially, of a body provided with attachments for draft-animals, and a bar loosely connected to said body and trailing to the rear nearly parallel with the surface of the ground, the rear end of said bar being rounded to lie close to but not enter the ground when the drag is backed.

4. The hay-drag consisting, essentially, of a sulky-body, a drag-bar loosely connected thereto, so as to be free to swing sidewise and trailing to the rear nearly parallel with the surface of the ground, and means for securing a hay-cock to said drag-bar, substantially as described.

In testimony whereof I affix my signature in presence of two witnesses.

RICHARD GREGG.

Witnesses:
   W. A. BARTLETT,
   S. BRASHEARS.